(12) United States Patent
Miranda et al.

(10) Patent No.: US 12,549,007 B2
(45) Date of Patent: Feb. 10, 2026

(54) SYSTEMS AND METHODS OF LOAD PRE-CHARGING

(71) Applicant: Caterpillar Inc., Peoria, IL (US)

(72) Inventors: Jose Miranda, Peoria, IL (US); Andrew M. Moruzi, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/670,969

(22) Filed: May 22, 2024

(65) Prior Publication Data

US 2025/0364809 A1   Nov. 27, 2025

(51) Int. Cl.
*H02J 3/00* (2006.01)
*H01C 7/02* (2006.01)
*H02J 3/007* (2026.01)

(52) U.S. Cl.
CPC ............... *H02J 3/007* (2020.01); *H01C 7/02* (2013.01)

(58) Field of Classification Search
CPC .................................. H02J 3/007; H01C 7/02
USPC .......................................................... 307/18
See application file for complete search history.

(56) References Cited

U.S. PATENT DOCUMENTS

| 8,237,539 | B2 | 8/2012 | Bratkovski et al. |
| 8,766,602 | B1 | 7/2014 | Kimes |
| 2020/0274385 | A1 | 8/2020 | Saito |
| 2023/0163602 | A1 | 5/2023 | Liu et al. |
| 2024/0243590 | A1* | 7/2024 | Badash ................ H02J 7/0024 |
| 2024/0371549 | A1* | 11/2024 | Guo ....................... H01C 7/028 |

FOREIGN PATENT DOCUMENTS

| CN | 202172394 U | 3/2012 |
| CN | 202602265 U | 12/2012 |
| CN | 212751788 U | 3/2021 |

OTHER PUBLICATIONS

Written Opinion and International Search Report for Int'l. Patent Appln. No. PCT/US2025/028082, mailed Aug. 26, 2025 (13 pgs).

* cited by examiner

*Primary Examiner* — Richard Tan

(74) *Attorney, Agent, or Firm* — Foley & Lardner LLP (Dallas)

(57) ABSTRACT

Systems and methods for load pre-charging may include a machine having one or more machine batteries, one or more machine loads, and a pre-charge circuit intermediary to the one or more machine batteries and the one or more machine loads. The pre-charge circuit may include a power resistor electrically coupled in series with the one or more machine batteries. The pre-charge circuit may include a plurality of arrays of positive temperature control (PTC) resistors, the plurality of arrays of PTCs resistors electrically coupled in parallel with one another, and in series between the power resistor and the one or more machine loads.

19 Claims, 3 Drawing Sheets

SYSTEMS AND METHODS OF LOAD PRE-CHARGING

TECHNICAL FIELD

The present disclosure relates generally to the field of pre-charging, including but not limited to systems and methods of load pre-charging from machine battery sources.

BACKGROUND

As electrification is applied across industries, some types of electrified machines may involve pre-charging of machine loads. For example, heavy machinery with high load capacitances may use pre-charging on the direct current (DC) link so as to avoid influx of power, which can result to machine load damages. Some pre-charge solutions may use positive thermal coefficient (PTC) resistors to provide such pre-charging. For example, U.S. Pat. No. 8,766,602 describes a battery charging system which includes a pre-charge control circuit for electrically coupling a plurality of power supply terminals to a plurality of load terminals. The pre-charge control circuit includes a plurality of switching elements for selectively coupling at least one of the plurality of power supply terminals and one of the plurality of power supply using one of a pre-charge current path and a standard charge current path. The pre-charge current path includes at least one pre-charge resistor in series with a positive temperature coefficient (PTC) resistor.

Depending on the type of machine—particularly ones with high load capacitances, the number of PTC resistors for pre-charge can exponentially increase, resulting in increased space usage in the machine and increase cost associated therewith.

SUMMARY

A first aspect provided herein relates to a machine. The machine includes one or more machine batteries, one or more machine loads, and a pre-charge circuit intermediary to the one or more machine batteries and the one or more machine loads. The pre-charge circuit includes a power resistor electrically coupled in series with the one or more machine batteries. The pre-charge circuit may also include a plurality of arrays of positive temperature control (PTC) resistors, the plurality of arrays of PTCs resistors electrically coupled in parallel with one another, and in series between the power resistor and the one or more machine loads.

A second aspect provided herein relates to a method of controlling power of a machine. The method includes receiving a command to charge one or more machine loads of a machine via one or more machine batteries of the machine. The method includes controlling a switch to operate in a first position, responsive to receiving the command, the switch supplying power from the one or more machine batteries by a first path via a pre-charge circuit to the one or more machine loads, the pre-charge circuit comprising a power resistor electrically coupled in series with the one or more machine batteries, and a plurality of arrays of positive temperature control (PTC) resistors, the plurality of arrays of PTCs resistors electrically coupled in parallel with one another, and in series between the power resistor and the one or more machine loads. The method includes determining a duration in which the power is supplied by the one or more machine batteries and a voltage, sensed via a voltage sensor, at an input side of the one or more machine loads. The method includes controlling the switch to operate in a second position, responsive to the duration and the voltage satisfying one or more criteria, to supply power from the one or more machine batteries by a second path to the one or more machine loads.

A third aspect provided herein relates to a pre-charge circuit. The pre-charge circuit includes a power resistor electrically coupled in series with one or more machine batteries of a machine. The pre-charge circuit includes a plurality of arrays of positive temperature control (PTC) resistors, the plurality of arrays of PTCs resistors electrically coupled in parallel with one another, and in series between the power resistor and one or more machine loads of the machine.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
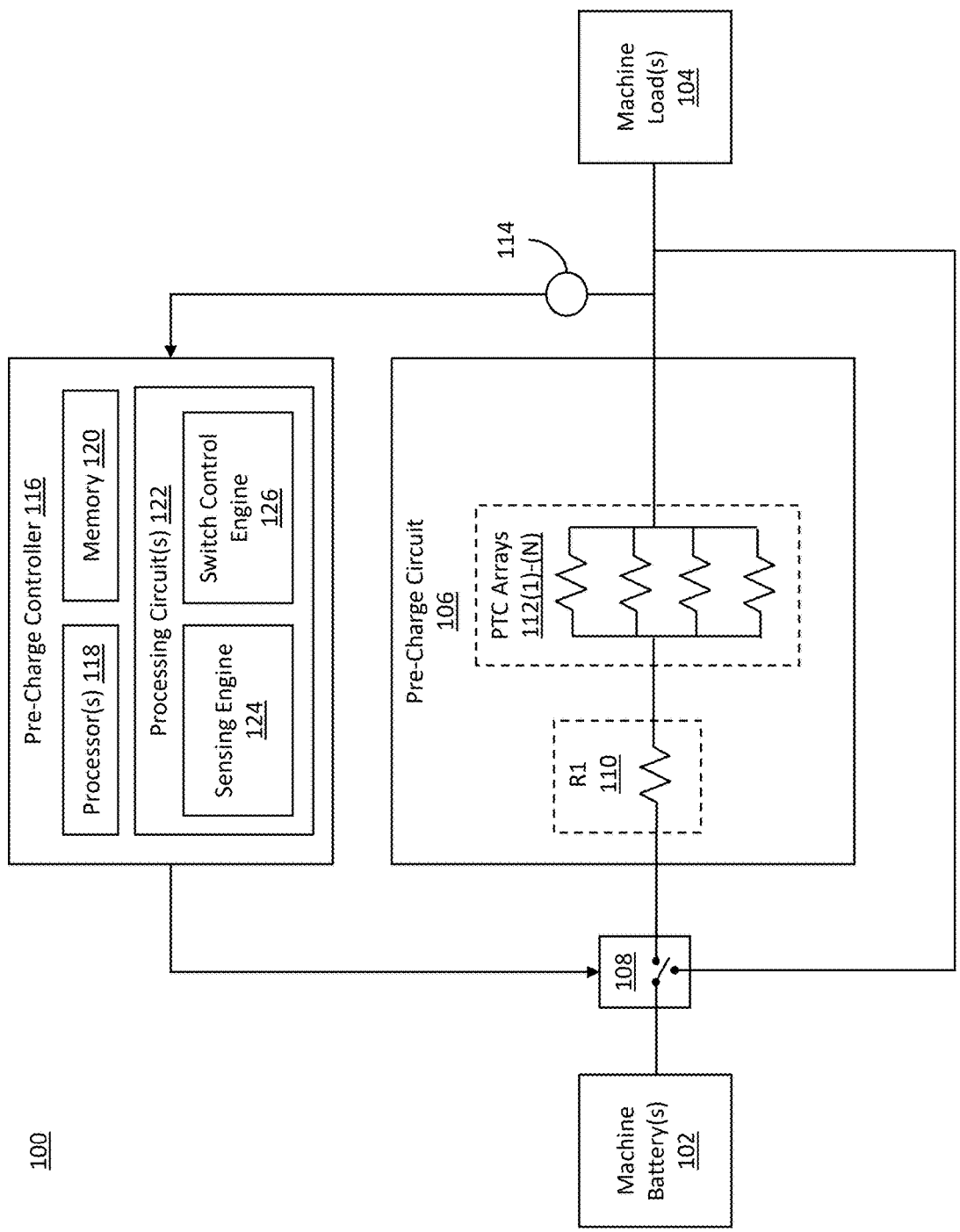
FIG. 1 is a diagram of a machine including a pre-charge circuit, according to an embodiment of the present disclosure.

Referring now to FIG. 1, depicted is a diagram of a machine 100, according to an example implementation of the present disclosure. The machine 100 may be or include any type or form of machine which uses high voltage DC links and has high capacitance loads. For example, the types or forms of machines may be or include electric trains, marine machines, electric mining shovels, large mining trucks, and so forth. The high voltage direct current (DC) link may be or include or deliver a voltage of 1,000 volts (V) (or greater). Similarly, such types of machines may have a high capacitance loads, for example, of 30 millifarads (mF) (or greater). In various embodiments, other smaller machines (such as small machines, automobiles, etc.) may also leverage the systems and methods described herein, though such systems may not have the same technical benefits resultant from the systems and methods described herein.

The machine 100 may include one or more machine batteries 102 and one or more machine loads 104. The machine batteries 102 may be or include any type or form of battery/battery bank/battery pack capable of or configured to supply power to the one or more machine loads. The machine batteries 102 may be configured to supply (e.g., DC) power at high voltages, such as equal to or in excess of 1,000 V. The machine loads 104 may be or include any type or form of machine loads 104, depending on the type of machine 100. For example, the machine loads 104 may include electric drive motors, actuators, and so forth. The machine loads may have a total capacitance of, for example, at least 30 mF.

The machine 100 may include a pre-charge circuit 106 arranged intermediary the machine batteries 102 and machine loads 104. As described in greater detail below, in operation, when the machine 100 is started and/or prior to power being supplied directly to the load(s) 104, the power may be initially routed to the machine loads 106 via the pre-charge circuit 106, to pre-charge the machine loads 106. For example, if pre-charging were not provided, in-rush power and current could damage the machine loads 106 (particularly where capacitors of the machine loads 106 are in a discharged state), cause arcing, overheating, and so forth. Additionally, if pre-charging were not provided, the in-rush current could reduce lifespan and performance of the batteries 102 and/or machine loads 104. The machine batteries 102 may be configured to supply power to the machine loads 104 via the pre-charge circuit 106, to gradually increase the voltage to the machine loads 104, to avoid such in-rush current.

The machine 100 may include a switch 108 arranged, situated, or electrically coupled between the pre-charge circuit 106 and the machine batteries 102. The switch 108 may be or include a switch or relay designed or configured to switch between power supplied along a first path (e.g., via the pre-charge circuit 106) to the machine loads 104, and a second path (e.g., direct) to the machine loads 104. In other words, an input of the switch 108 may be electrically connected to the output of the machine batteries 102, and the switch 108 may be configured to operate to switch between a connection between the input of the switch and a first output corresponding to the first path, and a second output corresponding to the second path. In various embodiments, the switch 108 may include a contactor relay, soled state relay, power metal oxide semiconductor field-effect transistor (MOSFET), or any other type or form of switch or relay capable of controlling power delivery from the machine batteries 102 to the machine loads 104 along the first or second path.

The pre-charge circuit 106 may include one or more power resistors 110 and a plurality of arrays of positive temperature coefficient (PTC) resistors 112(1)-112(N) (referred to generally as "arrays of PTC resistors 112" or "array 112"). As shown, the power resistor 110 may be electrically connected between the machine batteries 102 and the arrays of PTC resistors 112. An input of the power resistor 110 may be electrically connected to the batteries 102, and an output of the power resistor 110 may be electrically connected to inputs of the arrays of PTC resistors 112. More specifically, the input of the power resistor 110 may be electrically connected to the switch 108 (e.g., the first output of the switch 108). The pre-charge circuit 106 may be configured to provide a total resistance, which is equal to a sum of a resistance of the power resistor 110 and an effective resistance of the arrays of PTC resistors 112. The total resistance and the resistance of the power resistor 110 (and correspondingly, the effective resistance of the arrays of PTC resistors 112) may be selected based on or according to the specific type of application or use case of the machine 100.

The arrays of PTC resistors 112 may be arranged in parallel with one another. In other words, a first array of PTC resistor 112(1) may be arranged in parallel with each of a second through N-th array of PTC resistors 112(2)-(N). The arrays of PTC resistors 112 may be arranged in parallel with one another, and electrically connected in series between the power resistor 110 and the machine load(s) 104. In other words, an input of the array of PTC resistors 112 may be electrically connected to the output of the power resistor, and an output of the array of PTC resistors 112 may be electrically connected to the input of the machine load(s) 104.

Figure 2:
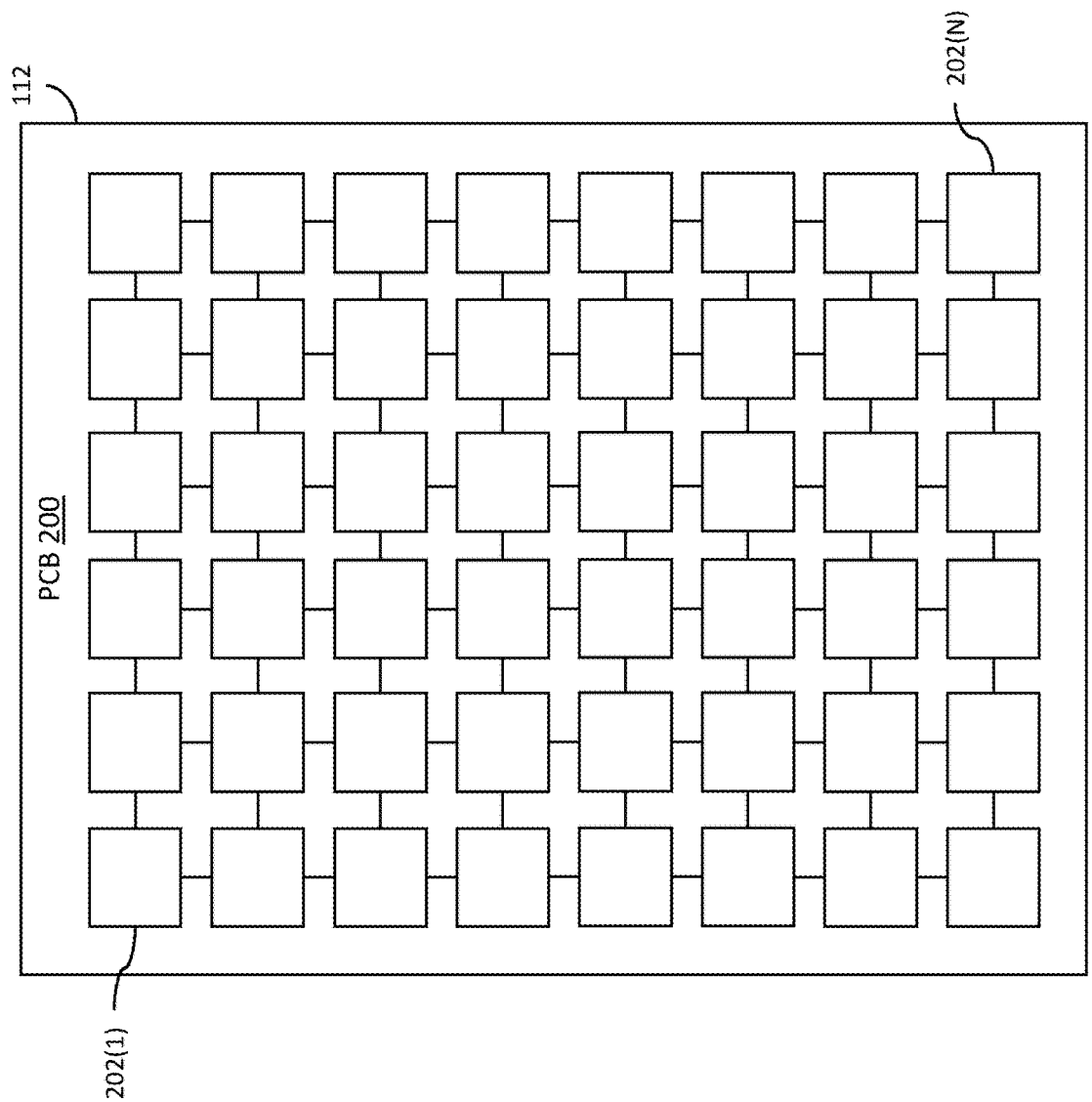
FIG. 2 is a diagram of an array of positive thermal coefficient resistors of the pre-charge circuit of FIG. 1, according to an embodiment of the present disclosure.

Referring to FIG. 1 and FIG. 2, depicted in FIG. 2 is an array of PTC resistors 112 of the pre-charge circuit 112, according to an example implementation of the present disclosure. As shown in FIG. 2, the array of PTC resistors 112 may be or include a board 200 (e.g., a printed circuit board (PCB)), supporting, connecting, or otherwise providing NxN PTC resistors 202(1)-202(N). As shown in FIG. 2, each PTC resistor 202 of a given row of PTC resistors 202 may be electrically connected in series with the adjacent PTC resistors 202. Similarly, each given row of PTC resistors 202 may be electrically connected in parallel with the upper and/or lower row(s) of PTC resistors 202. Accordingly, the PTC resistors 202 may be arranged both in series and in parallel with other PTC resistors 202, thereby forming the array of PTC resistors 112.

Each PTC resistor 202 may be configured to modify a resistance level, based on a change in temperature. For example, as the temperature of the PTC resistors 202 increases, the resistance may correspondingly increase. In this regard, once the temperature of the PTC resistor 202 meet or exceed a threshold temperature, the resistance of the PTC 202 may be increased to a level which, in effect, creates an open circuit (or infinite resistance). As stated above, the resistance of each PCT resistor 202 may be selected to provide a corresponding array resistance of each array 112, and correspondingly an effective resistance of the plurality of array of PCT resistors 112(1)-(N), based on or according to the particular application or use case of the machine 100.

Referring back to FIG. 1, the machine 100 may include one or more sensors 114. In some embodiments, the one or more sensors 114 may be configured to measure, determine, identify, quantify, or otherwise sense one or more conditions corresponding to pre-charging of the machine load(s) 104 and/or the pre-charge circuit 106. For example, the sensor(s) 114 may be or include a voltage sensor. The voltage sensor may be arranged to sense a voltage at the output side of the pre-charge circuit 106 (e.g., the input side of the machine load(s) 104. As described in greater detail below, the sensed voltage may be used as an input for controlling the switch 108 to supply power via the first or second path.

The machine 100 may include a pre-charge controller 116. The pre-charge controller 116 may be or include any device, component, element, or hardware designed or configured to control the switch 108, to correspondingly control pre-charging of the machine load(s) 104. In some embodiments, the pre-charge controller 116 may be a component of the electronic control unit (ECU), a battery management system BMS), or any other computer/hardware of the machine 100.

The pre-charge controller 116 may include one or more processors 118 and memory 120. The processor(s) 118 may be or include any device, component, element, or hardware designed or configured to perform the various steps recited herein. For example, the processor(s) 118 may include any number of general purpose single- or multi-chip processors, digital signal processors (DSP), application specific integrated circuits (ASIC), field programmable gate arrays (FPGA), or other programmable logic device(s), discrete gate or transistor logic, discrete hardware components, or any combination thereof designed or configured to perform the various steps recited herein. In some embodiments, the microgrid controller 104 may include a single processor 118 designed or configured to perform each of the various steps recited herein.

In some embodiments, the pre-charge controller 116 may include multiple processors 118 which are designed or configured perform (e.g., either separately or together) each of the various steps recited herein. As one example, the pre-charge controller 116 may include a first processor 118 designed or configured to perform a first subset of the various steps, and a second processor 118 designed or configured to perform a second subset of the various steps (with the first subset being different from the second subset). As another example, the pre-charge controller 116 may include first and second processors 118 which together perform the various steps in a distributed fashion. As such, unless explicitly indicated otherwise, such as by use of a term such as "a single processor", the term "one or more processor(s)" as used herein contemplates and encompasses embodiments in which all of the one or more processors perform all of the recited steps or features, different processors separately perform different ones of the steps or features, the same or different sets of two or more processors work in combination to perform individual steps or features, or any variation thereof. In other words, unless explicitly indicated otherwise, the use of the term "one or more processors" herein contemplates and encompasses a single processor performing all of the steps or features and two or more processors working individually or in combination, where each step or feature is performed by any one or combination of two or more of the processors. The memory 120 may be or include any type or form of data storage device, including tangible, non-transient volatile memory and/or non-volatile memory.

The pre-charge controller 116 may include one or more processing circuits 122. The processing circuit(s) 122 may be or include any device, component, element, or hardware, or combination thereof, designed or configured to perform one or more dedicated functions. In various embodiments, the processing circuit(s) 122 may be or include processor(s) 118 which execute instructions stored in memory 120 which causes the processor(s) to perform corresponding functions. The processing circuit 122 may include a sensing engine 124 and a switch control engine 126. While these processing circuits 122 are shown and described, in various embodiments, additional and/or alternative processing circuits 122 may be incorporated into the pre-charge controller 116. Additionally, one processing circuit 122 may be divided into multiple processing circuit 122, and/or two or more processing circuits 122 may be combined into a single processing circuit 122.

The pre-charge controller 116 may include a sensing engine 124. The sensing engine 124 may be or include any device, component, element, or hardware designed or configured to sense, measure, quantify, identify, or otherwise determine one or more conditions of the machine 100. In some embodiments, the sensing engine 124 may be configured to determine the condition(s) of the machine 100 based on or according to measurements from the sensor(s) 114. The condition(s) may be or include a voltage condition and/or a duration condition. For example, the sensing engine 124 may be configured to determine a first condition corresponding to a voltage sensed by the sensor(s) 114, and a second condition corresponding to a duration. As described above, the voltage may be or include a voltage on an output side of the pre-charge circuit 106 and/or at an input side of the machine loads 104. The sensing engine 124 may be configured to determine the condition(s) of the machine 100 while the machine battery(s) 102 supply power via the pre-charge circuit 102. In other words, as the machine battery(s) 102 supply power via the pre-charge circuit 102 to the machine load(s) 104, the voltage at the input side of the machine load(s) 104 may gradually increase. The sensing engine 124 may be configured to monitor the change in voltage at the input side. The sensing engine 124 may be configured to determine the second condition corresponding to the duration. The duration may be or include a duration in which power is output by the machine batteries 102. For example, the sensing engine 124 may be configured to measure the duration based on or according to a clock signal starting from a time in which the battery(s) 102 are controlled to output power (e.g., via the pre-charge circuit 106).

The pre-charge controller 116 may include a switch control engine 126. The switch control engine 126 may be or include any device, component, element, or hardware designed or configured to configure, operate, modify, or otherwise control the switch 108, according to the sensed condition(s) of the machine 100. In some embodiments, the switch control engine 126 may be configured to control the switch 108 to operate or switch between the first path and the second path. The switch control engine 126 may be configured to control the switch based on the condition(s) satisfying one or more criteria. For example, the switch control engine 126 may be configured to operate the switch 108 in a first position (e.g., corresponding to the first path) at start-up/warm-up, and as the condition(s) of the machine 100 change in a manner which satisfies the criteria, the switch control engine 126 may be configured to operate the switch 108 in a second position (e.g., corresponding to the second path). In some embodiments, the criteria may be or include a minimum duration (e.g., five seconds) and/or a minimum voltage (e.g., 95% of the output voltage from the battery(s) 102). In some embodiments, the switch control engine 126 may be configured to operate the switch 108 in the second position, responsive to one of the criteria being satisfied (e.g., the sensed voltage meeting or exceeding the minimum voltage). In some embodiments, the switch control engine 126 may be configured to operate the switch 108 in the second position, responsive to both of the criteria being satisfied (e.g., the sensed voltage meeting or exceeding the minimum voltage, and the duration in which power is supplied from the battery(s) 102 meeting or exceeding the minimum duration). In this embodiment, even if (for example) the sensed voltage meets or exceeds the minimum voltage, the switch control engine 126 may be configured to maintain the switch 108 in the first position corresponding to the first path until the minimum duration condition is satisfied.

INDUSTRIAL APPLICABILITY

The disclosed embodiments may be applicable to any power control system or solution, though may have particular relevance to power control systems in machines or use cases which include high voltage batteries (e.g., greater than or equal to 1,000V) and high capacitance loads (e.g., greater than or equal to 30 mF). Such machines or use cases may include, for example, use cases in electric rail systems, electric marine or aquatic systems, electric mining systems, etc. The systems and methods described herein may conserve space in deployment, by reducing the total number of PTC resistors used in the deployed machine, while still providing the technical benefits of PTC resistors (by combining such resistors with a power resistor).

Figure 3:
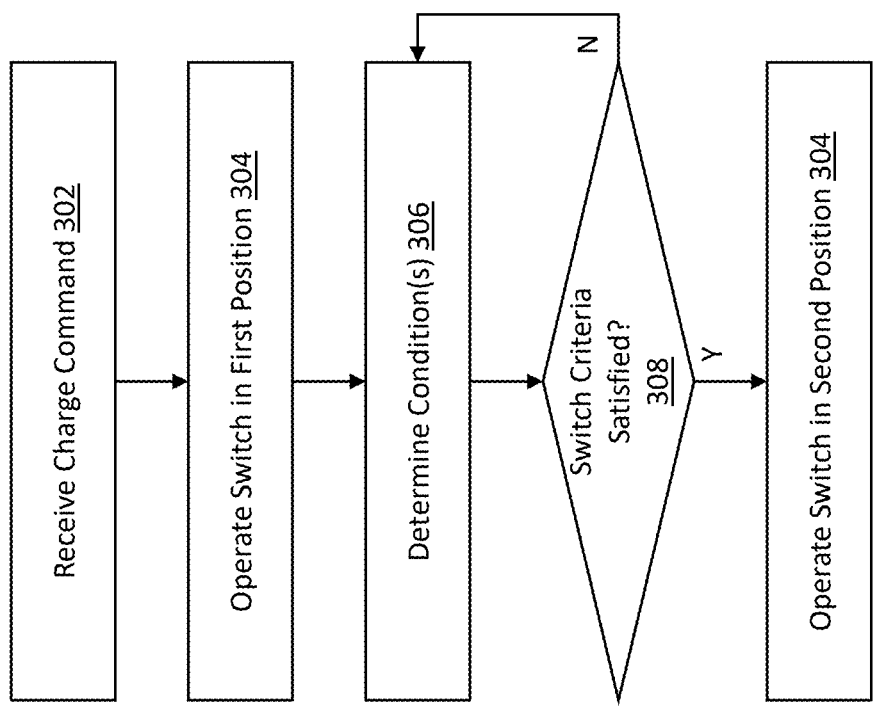
FIG. 3 is a flowchart showing a method of controlling power of a machine, according to an embodiment of the present disclosure.

Referring now to FIG. 3, depicted is a flowchart showing an example method 300 of load pre-charging, according to an example implementation of the present disclosure. The method 300 may be performed by, implemented on, or otherwise executed by the components, elements, or hardware described above with reference to FIG. 1 through FIG. 2. For example, the method 300 may be executed by the pre-charge controller 116 of FIG. 1. As a brief overview, at step 302, a controller may receive a charge command. At step 304, the controller may operate a switch in a first position. At step 306, the controller may determine conditions. At step 308, the controller may determine whether switch criteria is satisfied. At step 310, the controller may operate the switch in a second position.

At step 302, a controller may receive a charge command. In some embodiments, the controller (e.g., pre-charge controller 116) may receive a command to charge one or more machine loads 104 of a machine 100 via one or more machine batteries 102 of the machine 100. For example, the controller may receive the charge command responsive to the machine being turned on, responsive to the machine being shifted from idle, etc. The controller may receive the charge command based on an input received from a user (e.g., to operate or otherwise control the machine). The controller may receive the charge command, responsive to the machine load(s) being fully discharged. For example, the machine load(s) may have a capacitance (e.g., of at least 30 mF), where such capacitors are fully discharged (e.g., resultant from previous operation of the machine and/or gradual discharge).

At step 304, the controller may operate a switch in a first position. In some embodiments, the controller may control a switch (e.g., switch 108) to operate in the first position responsive to receiving the command. In some embodiments, the first position may cause the switch to supply power from the machine battery(s) 102 via a pre-charge circuit (e.g., the pre-charge circuit 106 described above) to the machine load(s) 104. In this regard, the controller may operate the switch in the first position, responsive to receiving the charge command, to first pre-charge the machine load(s) 104 (e.g., prior to supplying full power to the machine load(s) 104 as described below). Such implementations may be a safety precaution to prevent overheating, arcing, fusing, or any other issues that can result when pre-charging does not occur.

At step 306, the controller may determine conditions. In some embodiments, the controller may determine conditions corresponding to the machine 100. The controller may determine the conditions as power is supplied from the machine battery(s) 102 via the first path (e.g., through the pre-charge circuit 106). The controller may determine the conditions based on one or more sensor measurements. For example, the controller may determine a voltage, sensed by a voltage sensor 114, at an input side of the machine load(s) 104. In some embodiments, the controller may request a voltage signal (e.g., from the voltage sensor 114) on demand. In some embodiments, the controller may periodically receive the voltage signal from the voltage sensor 114. In some embodiments, the controller may determine a duration in which the power is supplied by the one or more machine batteries. The controller may determine the duration based on a clock signal of the machine and/or controller. In other words, the condition(s) determined at step 306 may be or include a voltage condition and/or a duration condition.

At step 308, the controller may determine whether switch criteria is satisfied. In some embodiments, the controller may determine whether the switch criteria is satisfied, based on one or more of the condition(s) determined at step 306. In some embodiments, the controller may determine whether the switch criteria is satisfied, by applying the conditions to corresponding criterion. As one example, in some embodiments, the switch criteria may be satisfied responsive to one of the condition(s) determined at step 306 being satisfied. For example, the controller may determine that the switch criteria is satisfied responsive to determining that the voltage signal indicates that the voltage satisfies a minimum voltage criterion. The minimum voltage criterion may be or include the voltage being within, at least, 95% of a voltage output by the one or more machine batteries.

In some embodiments, the switch criteria may be satisfied responsive to each of the condition(s) determined at step 306 satisfying their corresponding criterion. For example, the controller may determine that the switch criteria is satisfied responsive to the voltage satisfying a minimum voltage criterion and the duration satisfying a minimum duration criterion. In this regard, even in instances where the voltage corresponding to the voltage signal satisfied the minimum voltage criterion (e.g., within 95% of the voltage output by the batteries 102), the switching criteria may still not be satisfied if, for instance, the duration is less than the minimum duration criterion. In such an example, once the duration satisfies the minimum duration criterion, the voltage corresponding to the voltage signal may be substantially closer to the voltage output by the batteries 102 (e.g., within 97%, within 98%, etc.).

Where, at step 308, the controller determines that the switch criteria is not satisfied, the method 300 may return back to step 306. In this regard, the controller may iteratively determine the condition(s) of the machine 100 for comparison to corresponding criterion, until the switch criteria is satisfied. Once the switch criteria is satisfied, the method 300 may proceed to step 310.

At step 310, the controller may operate the switch in a second position. In some embodiments, the controller may control the switch 108 to operate in a second position, responsive to the switch criteria being satisfied. In the second position, the switch 108 may supply power from the one or more machine batteries 102 by a second path to the one or more machine loads 104. In this regard, the controller may operate the switch in the second position responsive to the duration and the voltage satisfying one or more criteria.

According to the systems and methods described herein, by providing the pre-charge circuit 106 as described, space savings can be achieved in the machine. Additionally, the pre-charge circuit 106 including the power resistor in series with the arrays of PTC resistors (which themselves are in parallel) allows for efficient pre-charging of machine load capacitances, particularly for high voltage and high capacitances. The pre-charge circuit 106 also may provide increased safety, by preventing various conditions which result from an absence of pre-charging. Further, the pre-charge circuit 106 may provide the technical benefits of the PTC resistors 200 (e.g., by arranging those as arrays in parallel with one another) and reliability of power resistors 110 (by arranging that in series with the paralleled arrays of PTC resistors), particularly for high voltage/high capacitance machines.

What is claimed is:

1. A machine, comprising:
   one or more machine batteries;
   one or more machine loads; and
   a pre-charge circuit intermediary to the one or more machine batteries and the one or more machine loads, the pre-charge circuit comprising:
   a power resistor electrically coupled in series with the one or more machine batteries; and
   a plurality of arrays of positive temperature control (PTC) resistors, each array including a plurality of PTC resistors arranged in an N-by-M series-parallel array, the plurality of arrays of PTC resistors electrically coupled in parallel with one another, and in series between the power resistor and the one or more machine loads, wherein N is two or more of the plurality of PTC resistors and M is two or more of the plurality of PTC resistors.

2. The machine of claim 1, wherein the one or more machine batteries are configured to deliver a voltage greater than or equal to 1,000 volts (V).

3. The machine of claim 1, wherein the one or more machine loads have a capacitance greater than or equal to 30 millifarads (mF).

4. The machine of claim 1, wherein each array of the plurality of arrays of PTC resistors includes a six-by-eight array of PTC resistors.

5. The machine of claim 1, wherein the plurality of arrays of PTC resistors in parallel with one another, has a first resistance which is substantially equal to a second resistance of the power resistor.

6. The machine of claim 5, wherein a total resistance of the pre-charge circuit is equal to a sum of the first resistance and the second resistance, and wherein the first resistance is between 40-60% of the total resistance.

7. The machine of claim 1, further comprising a switch arranged between the one or more machine batteries and the power resistor, the switch configured to operate to control flow of power from the one or more machine batteries, either by a first path via the pre-charge circuit to the one or more machine loads, or by a second path directly to the one or more machine loads.

8. The machine of claim 7, further comprising:
a voltage sensor arranged to sense a voltage at an input side of the one or more machine loads; and
one or more controllers communicably coupled to the switch and the voltage sensor, the one or more controllers configured to control the switch according to the voltage sensed by the voltage sensor.

9. The machine of claim 8, wherein the one or more controllers are configured to:
receive, via the voltage sensor, a measurement indicative of the voltage at the input side;
identify a duration in which power is supplied from the one or more machine batteries via the pre-charge circuit to the one or more machine loads; and
control the switch according to the voltage and the duration.

10. The machine of claim 9, wherein the one or more controllers are configured to control the switch according to the voltage and the duration, by switching from the first path to the second path, responsive to the voltage satisfying a minimum voltage criterion and the duration satisfying a minimum duration criterion.

11. The machine of claim 10, wherein the minimum voltage criterion is the voltage being within, at least, 95% of a voltage output by the one or more machine batteries.

12. A method of controlling power of a machine, the method comprising:
receiving a command to charge one or more machine loads of the machine via one or more machine batteries of the machine;
controlling a switch to operate in a first position, responsive to receiving the command, the switch supplying power from the one or more machine batteries by a first path via a pre-charge circuit to the one or more machine loads, the pre-charge circuit comprising a power resistor electrically coupled in series with the one or more machine batteries, and a plurality of arrays of positive temperature control (PTC) resistors, the plurality of arrays of PTC resistors electrically coupled in parallel with one another, and in series between the power resistor and the one or more machine loads;
determining a duration in which the power is supplied by the one or more machine batteries and a voltage, sensed via a voltage sensor, at an input side of the one or more machine loads; and
controlling the switch to operate in a second position, responsive to the duration satisfying a minimum duration criterion and the voltage satisfying a minimum voltage criterion, to supply power from the one or more machine batteries by a second path to the one or more machine loads.

13. The method of claim 12, wherein the minimum voltage criterion comprises the voltage being within, at least, 95% of a voltage output by the one or more machine batteries.

14. The method of claim 12, wherein the one or more machine batteries deliver a voltage greater than or equal to 1,000 volts (V).

15. The method of claim 12, wherein the one or more machine loads have a capacitance greater than or equal to 30 millifarads (mF).

16. The method of claim 12, wherein each array of the plurality of arrays of PTC resistors includes a six-by-eight array of PTC resistors.

17. The method of claim 12, wherein the plurality of arrays of PTC resistors in parallel with one another, has a first resistance which is substantially equal to a second resistance of the power resistor.

18. The method of claim 17, wherein a total resistance of the pre-charge circuit is equal to a sum of the first resistance and the second resistance, and wherein the first resistance is between 40-60% of the total resistance.

19. A pre-charge circuit comprising:
a power resistor electrically coupled in series with one or more machine batteries of a machine; and
a plurality of arrays of positive temperature control (PTC) resistors, each array including a plurality of PTC resistors arranged in an N-by-M series-parallel array, the plurality of arrays of PTC resistors electrically coupled in parallel with one another, and in series between the power resistor and one or more machine loads of the machine, wherein N is two or more of the plurality of PTC resistors and M is two or more of the plurality of PTC resistors.

* * * * *